United States Patent [19]

Lochner

[11] Patent Number: 5,144,839
[45] Date of Patent: Sep. 8, 1992

[54] METHOD OF CHECKING THE PRESENCE OF A PIPELINE CONNECTION BETWEEN TWO END POINTS

[75] Inventor: Peter Lochner, Gröbenzell, Fed. Rep. of Germany

[73] Assignee: Fabriques de Tabac Reunies, S.A., Neuchatel, Switzerland

[21] Appl. No.: 580,311

[22] Filed: Sep. 10, 1990

[30] Foreign Application Priority Data

Sep. 12, 1989 [DE] Fed. Rep. of Germany ....... 3930424

[51] Int. Cl.⁵ .................. G01B 17/00; G01H 3/12
[52] U.S. Cl. ........................................ 73/609; 73/646
[58] Field of Search ................ 73/596, 597, 598, 599, 73/600, 609, 645, 646; 367/118, 902

[56] References Cited

U.S. PATENT DOCUMENTS

| | | | |
|---|---|---|---|
| 4,480,473 | 11/1984 | Varterasian | 73/596 |
| 4,584,676 | 4/1986 | Newman | 367/902 |
| 4,678,621 | 7/1987 | Callaghan et al. | 376/245 |
| 4,852,407 | 8/1989 | Komine et al. | 73/597 |
| 4,930,350 | 6/1990 | Bode et al. | 73/597 |
| 4,935,884 | 6/1990 | Hajicek | 73/631 |

FOREIGN PATENT DOCUMENTS

| | | |
|---|---|---|
| 0306110 | 3/1989 | European Pat. Off. . |
| 1473699 | 3/1969 | Fed. Rep. of Germany . |
| 2854238 | 6/1980 | Fed. Rep. of Germany . |
| 3444225 | 6/1986 | Fed. Rep. of Germany . |
| 3607913 | 8/1987 | Fed. Rep. of Germany . |
| 3806437 | 8/1989 | Fed. Rep. of Germany . |
| 1262359 | 10/1986 | U.S.S.R. . |
| 2193318 | 2/1988 | United Kingdom . |

OTHER PUBLICATIONS

*Materials Evaluation*, Feb. 1976, pp. 28-31.
"Terminal Selection Using Acoustic Triangulation Technique", *IBM Technical Disclosure Bulletin*, International Business Machines Corporation, vol. 28, No. 12, May 1986, pp. 5639-5641.

*Primary Examiner*—Hezron E. Williams
*Assistant Examiner*—Rose M. Finley
*Attorney, Agent, or Firm*—Jeffrey H. Ingerman

[57] ABSTRACT

The presence of pipeline connections can be checked by the transmitting of acoustic signals from a transmitter to an acoustic sensor within the pipe. This method is used in particular in the manufacture of cigarettes.

11 Claims, 4 Drawing Sheets

METHOD OF CHECKING THE PRESENCE OF A PIPELINE CONNECTION BETWEEN TWO END POINTS

BACKGROUND OF THE INVENTION

The present invention relates to a method of checking the existence of a pipeline connection between two end points.

Each type of cigarette consists of a unique tobacco blend which is transferred from a tobacco distributing place (feeder) by pipelines to the cigarette manufacturing machines (rod makers) by vacuum. In production plants in which several rod makers are simultaneously in operation there are therefore a large number of pipelines. Since at times, and frequently every day, new tobacco blends for the manufacture of cigarettes are required in the rod makers, the pipelines are frequently disconnected and reconnected, which easily leads to incorrect pipeline connections due to the difficulty in viewing the many pipelines. This difficulty in viewing the pipelines is further increased by the fact that rod makers and feeders are customarily located in different rooms or floors and therefore there are relatively large distances between them of, in some cases, more than 100 meters.

In order to avoid incorrect associations between feeder and rod maker leading to errors in production, the pipeline can be checked visually. However this requires a relatively large amount of work and furthermore is not an absolutely reliable method of verification due to the difficulty in viewing the pipelines. Another possibility of checking the pipe connections is to apply pressure. For this purpose however, closure caps must be placed on the end of the pipe, representing a resistance to flow upon the subsequent conveyance of the tobacco and leading to damage to the tobacco. The pipe connection can also be checked by applying a vacuum. However, it has been found with this method that the measurement instruments become clogged in the course of time by tobacco dust which settles out and that they thus become inoperable. Furthermore, under certain circumstances incorrect tobacco already in the pipeline may be conveyed by the application of a vacuum.

SUMMARY OF THE INVENTION

The object of the present invention therefore is to make available a simple and practical method of checking the existence of pipeline connections, i.e. to determine whether a pipe connection is present between two end points.

This object is achieved by the acoustic pipeline monitoring in accordance with the present invention in which acoustic signals are produced at one end point by a transmitter in the pipe, converted at the other end point by an acoustic sensor into an electrical signal and compared with a threshold value. If the signal exceeds the threshold value, a connection is present.

The pipeline monitoring method of the present invention has various advantages. It can be carried out at relatively little expense and represents a reliable method of checking. The checking of the existence of the pipe connection can be effected prior to the start of operations or else during operation. The transmitter and acoustic sensor (receiver) can be controlled by a stored program control so that verification can be effected automatically at regular intervals. The transmitter and receiver can be arranged outside the pipe with direct access to the pipe, so that no resistance to flow is present and the quality of the tobacco is not detrimentally affected.

It has been found preferable to adjust the acoustic intensity of the transmitter so that the signal received is at least 10 dB, and preferably 15 dB, above the background noise level in order to permit clear differentiation of the measurement signal from the background noise level.

Frequencies greater than 500 Hz, and preferably greater than 600 Hz, are suitable for carrying out the method, because normally, the background noise level at lower frequencies is very high. The noise level from surrounding activities (for example production) in the frequency range of about 600–1400 Hz is relatively continuous and low, so that with selective, high-energy acoustic radiation in this frequency range, large differences in noise level between background noise and the level of the useful signal can be expected.

In general, the frequency of the acoustic signal is chosen so that it is above the frequency of ambient noises and below an upper limit determined by the formula:

$$f = c/2d,$$

where f is the frequency, c is the acoustic velocity of the material (gas or other fluid) in the tube, and d is the inside diameter of the pipeline. The acoustic signal is preferably sinusoidal, and may be transmitted continually during times when measurement are being taken, or it may be transmitted in pulse form. When the signal is transmitted continually, it may be analyzed by continual comparison of the received signal with the threshold value. When the signal is transmitted in pulse form—i.e., periodically—it may be analyzed by determining how many times the received signal exceeds the threshold value.

The receiver is preferably coupled with a filter which passes only the frequency range radiated by the transmitter and thus substantially excludes disturbing influences of the environment. The measurement of the received signal is facilitated by the fact that the transmitter radiates signals within a very narrow frequency range.

The monitoring method of the present invention can be applied, in principle, to pipes of any inside diameter, for instance pipes having an inside diameter of from about 5 cm to about 35 cm. Furthermore, the pipes may be of any desired cross-section, such as round, oval, rectangular, square or polygonal.

The amplitude of the signal to be radiated by the transmitter loudspeakers depends on various factors. On the one hand, the volume decreases slowly due to damping in an empty pipe—i.e., a pipe which is filled only with air. In the case of a pipe having an inside diameter of 12 cm the decrease in the volume of the sound amounts to 0.3 dB per meter of pipe. For a pipe filled with tobacco, the degree of damping amounts to about 0.5 dB per meter of pipe. Furthermore, background noise must be taken into account. The necessary amplitude of the transmitter signal thus depends on the noise level and the length of pipe to be checked. In order to be able clearly to distinguish the signal arriving at the receiver from the background noise level, the signal amplitude should exceed the noise level by 10 dB, and preferably 15 dB.

For the operation of a rod maker, a pipeline (with an inside diameter of, for example, 120 mm) must be firmly attached to an outlet on the feeder. The pipeline preferably consists of straight pipes of different lengths (made of, e.g., the aluminum-magnesium alloy AlMg$_3$) and elbows (made of, e.g., the boiler-plate type steel known as St 37) with a deflection of up to 90°, which are connected at the joints with sockets of plastic (made of, e.g., cellulose acetobutyrate plastic (CAB)). The connection of the joints can, however, also be effected in any other known manner, such as by flanges, welding or clamping. For reasons of quality, the joints of the pipes or elbows should have a maximum distance apart of about 1 mm and no changes in cross-section or inserts should be present in the pipe. Typical distances between the outlet on the feeder and the rod maker are—depending on the location—between about 10 meters and about 130 meters.

The pipe connection opens downward on the feeder and is only partially covered during the feeding process by the tobacco drawn off. For the measurement, the pipe ends may be open or closed.

At the rod maker the pipe ends in a lock in which the tobacco conveyed is intercepted. The lock is connected to a vacuum pipe system via a check valve.

The pipe connections can, for example, be established between forty rod makers on one end and twenty feeders on the other end. Each feeder can have, for example, up to sixteen connections, i.e., up to sixteen rod makers can be connected to a feeder. In principle, each rod maker can be connected to each feeder.

The control for the operation can be effected by a Stored Program Control (SPC), such as a Simatic 150U SPC made by Siemens AG of Germany, which receives a signal from the rod maker indicating from which feeder tobacco is to be drawn. The SPC starts the feeding process and the flow of the tobacco within the feeder. In manual operation, the SPC receives no signal regarding whether or not a connection exists. In automatic operation, the SPC is connected to a microphone and loudspeaker control which monitors the connection control.

The method, as described, can be used for the pneumatic transport of solids as well as gases and liquids.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 2 and 2A (hereafter collectively referred to as FIG. 2) shows the results of a test with a transmitter frequency of 1,000 Hz on the pipeline having the transmission function shown in FIG. 1;

DETAILED DESCRIPTION OF THE INVENTION

Figure 1:
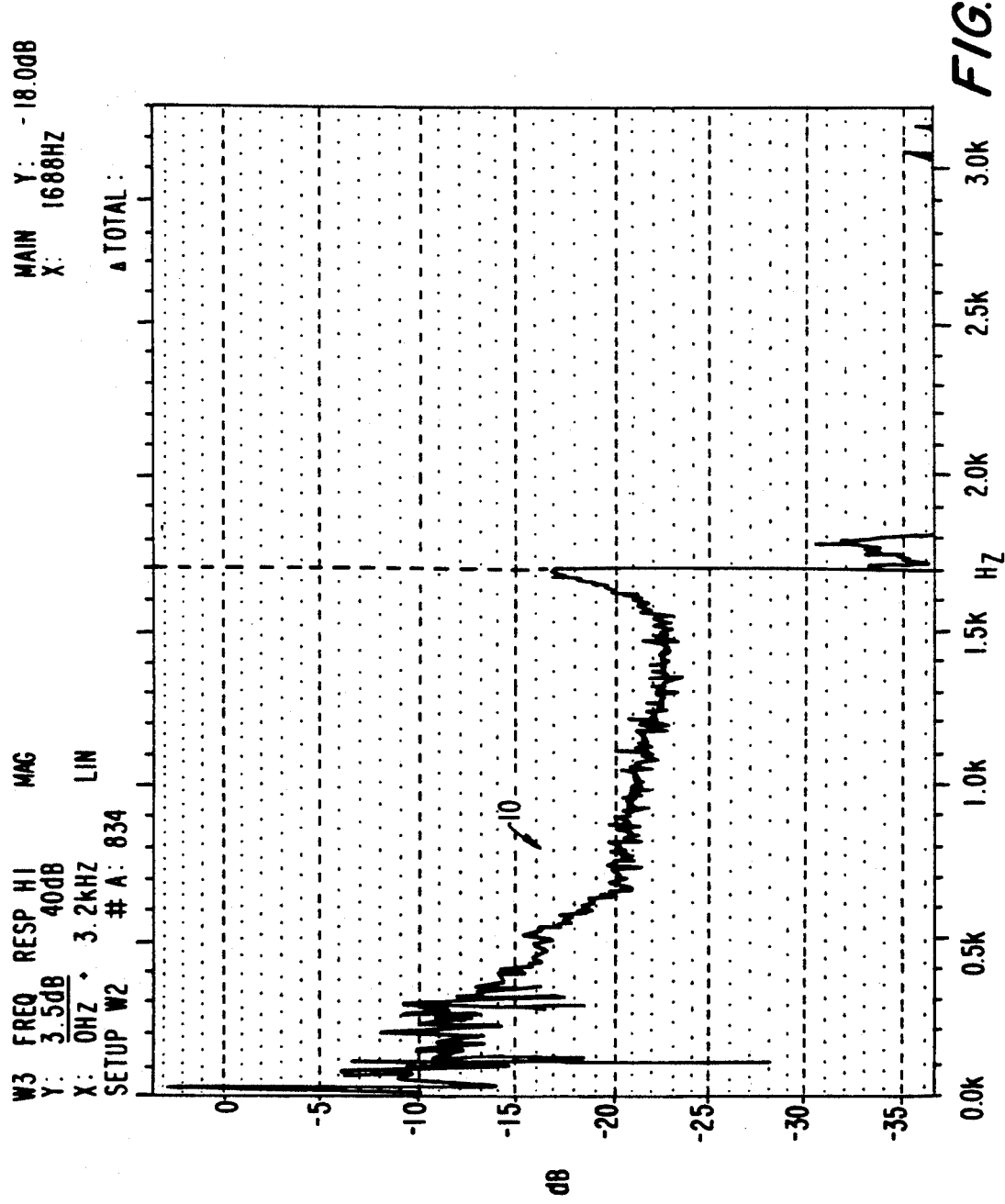
FIG. 1 shows the acoustic transmission function of a pipeline.

One embodiment of the invention is shown in the drawing and will be described in further detail below.

FIG. 1 shows the transmission function 10 determined for a 40-meter pipe having an inside diameter of 10.4 cm as a function of the frequency. It can be noted therefrom that for frequencies of less than 500 Hz, and even 600 Hz, no decrease in intensity of the acoustic signal is measured because of continuous background noise that is present in this frequency range. Therefore, measurement is not possible at those frequencies. With frequencies of more than 1680 Hz, measurement is also not possible since acoustic transmission does not occur.

Figure 2:
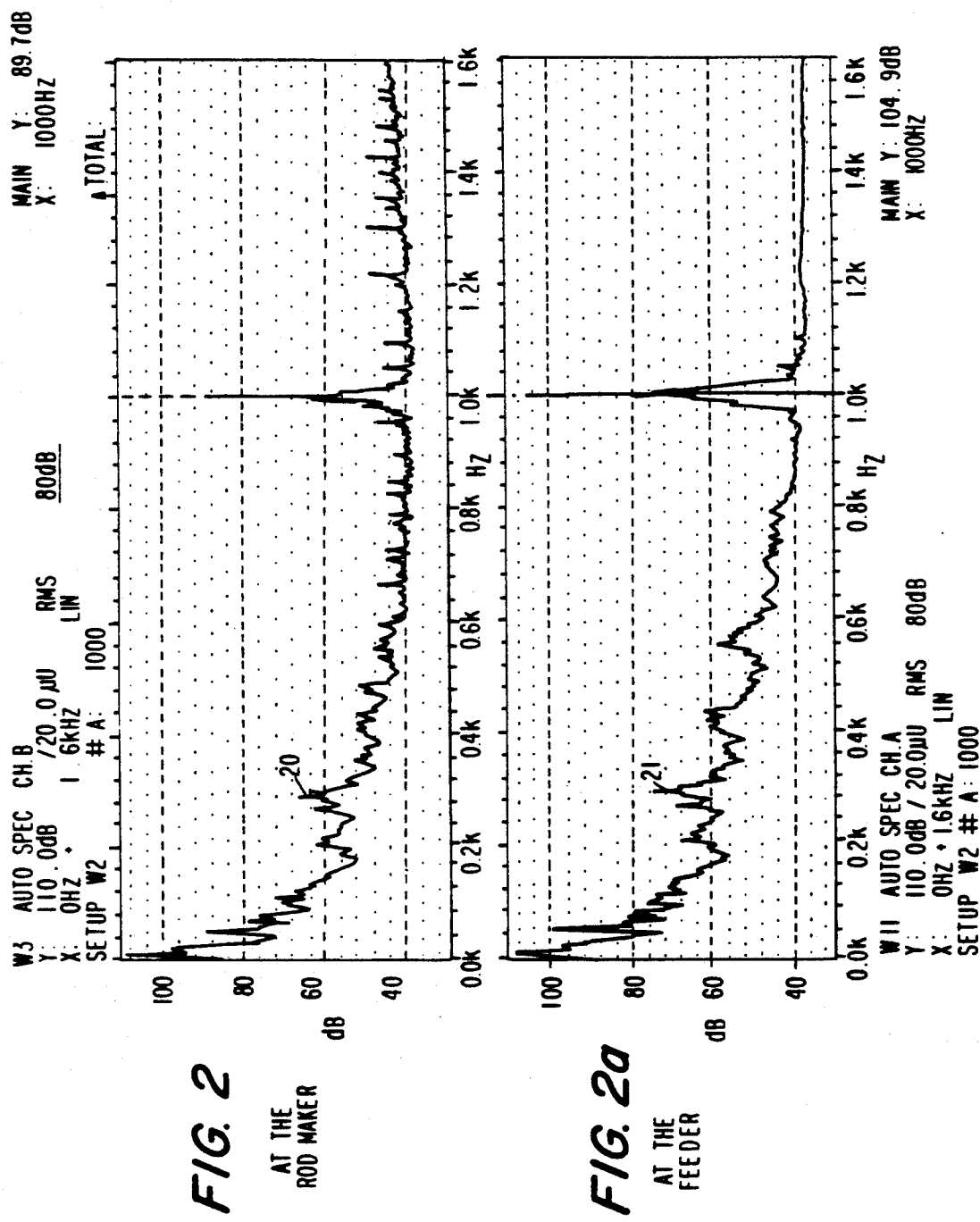

FIG. 2 shows the results obtained with tobacco-filled pipe having a length of 40 meters and an inside diameter of 12 cm. From the figure it can be seen that the acoustic volume of the signal 20 radiated by the transmitter to the receiver within a narrow frequency range around 1000 Hz is reduced from about 110 dB at the feeder to about 90 dB at the rod maker (signal 21), corresponding to a decrease of approximately 0.5 dB/per meter of filled pipe.

Figure 3:
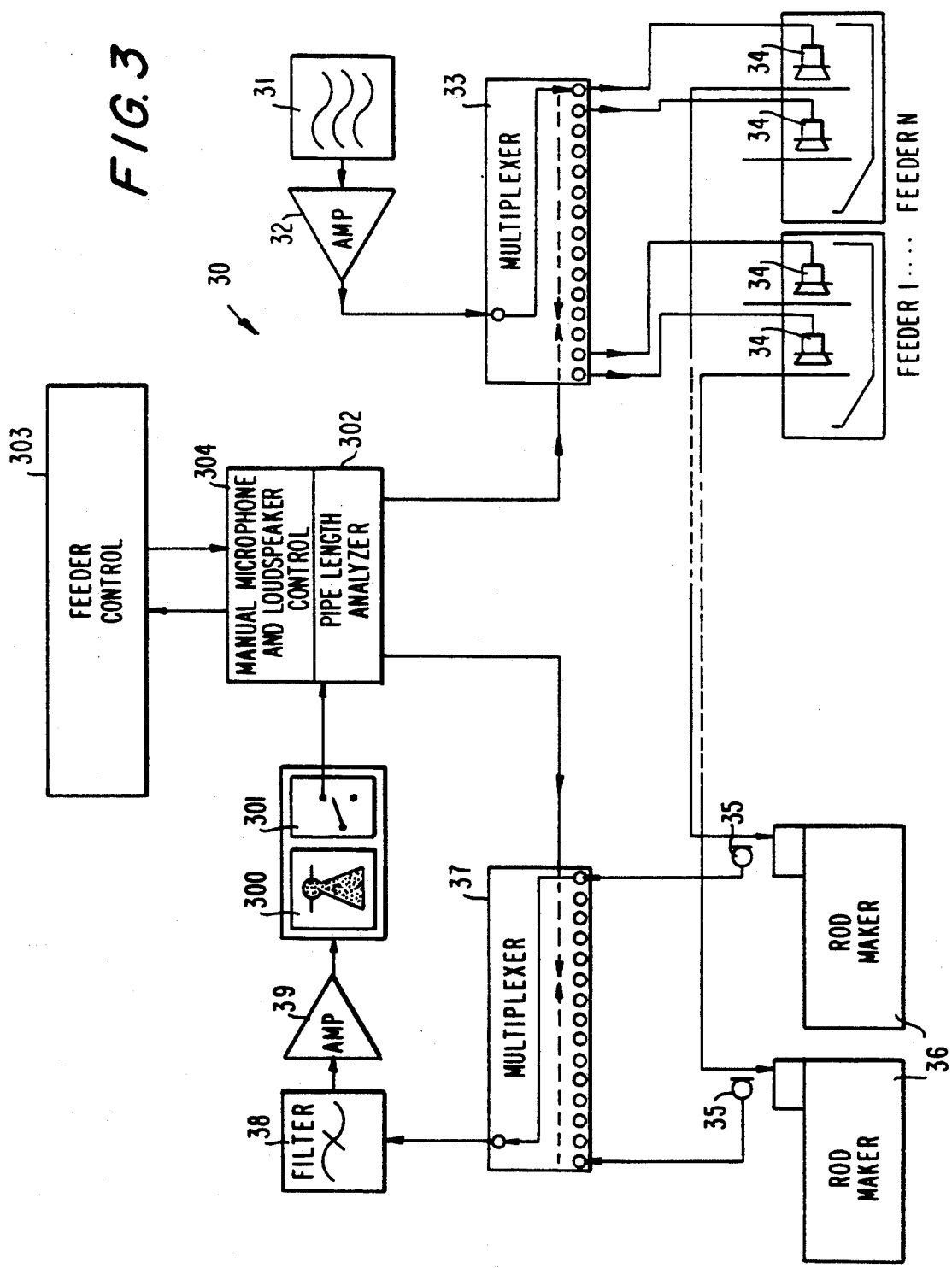
FIG. 3 is a circuit diagram for the automation of the method of the invention.

The method of the invention can be operated manually but it can also easily be automated. A typical circuit 30 for automation is shown in FIG. 3, using as example the manufacture of cigarettes. An acoustic signal is generated by frequency generator 31, amplified by amplifier 22, passed through transmitter multiplexer 33, and radiated by loudspeakers 34 arranged on N feeders. The signal is received, in the case f an existing pipe connection, by the acoustic sensor on the appropriate one of N rod makers 36 and conducted further via an N-channel microphone multiplexer 37, a filter 38 which preferably separates the transmission frequencies radiated by the loudspeaker from signals of other frequency, and an amplifier 39, to a threshold-value indicator 300. Threshold-value indicator 300 makes a yes/no decision depending on whether the signal received by the microphone 35 of the acoustic sensor reaches a threshold value or not, and controls the feeder via signal relay 301, pipe length analyzer 302, and feeder control 303. Automatic control for several pipes is possible by computer control of the corresponding transmitters and receivers via multiplexer and interrogation of the threshold value indicator. Loudspeakers 34 and microphones 35 can be controlled by manual microphone and loudspeaker control 304.

In this connection, a YES decision means that a continuous pipe connection is present between transmitter and receiver. A NO decision means that no pipe connection at all is present or else no continuous connection, for instance because there is clogging which additionally damps the acoustic signals.

In the case of manual operation, the functions necessary for the operation are monitored continuously by a separate error recognition circuit that indicates proper function or erroneous function. In the case of automatic operation with an SPC, the error recognition circuit functions as an error indicator, relaying signals to the SPC.

The modular construction of the monitoring unit makes it possible for the user to replace and change components of the system.

In order for the monitoring system to operate under defined conditions, microphones and loudspeakers coupled to the system must operate in the same frequency range as the narrow-band filter, if useful-signal analysis is to occur. Therefore coincidence control of filter range and useful signal is provided.

The filter in the analysis unit is preferably chosen depending on the type of analysis:

a) with a bandwidth of at most 10 Hz, if a direct comparison of useful-signal level and the background noise level (within the bandwidth of the filter) is effected, or b) with a band width of at most 60 Hz, if the comparison is effected only between the absolute useful-signal level (within the bandwidth of the filter) and a threshold value (fixed).

The value (YES/NO) obtained from the comparison, which indicates whether or not the useful-signal level is greater than the threshold value or the background noise level, and thus indicates whether or not there is a connection, is displayed in the case of manual operation, or fed to the SPC in the case of automatic operation.

For operation with the SPC as master, a multi-channel parallel bus can be developed on a 24 V DC basis (digital 1/0). The numbers identifying the rod maker microphone and the loudspeaker are transferred by the SPC to a feeder including a signal gate. The analysis station, in turn, provides signals for, for instance, readiness for measurement, system out of order (also provided in case of manual operation) and connection present between rod maker and feeder. For manual operation, the operator would similarly be able to specify which rod maker microphone and which loudspeaker should be connected, as well as to control the start of measurement.

The transmitter (loudspeaker) and receiver (microphone) required for the pipe monitoring method are commercially available. As the loudspeakers, membrane loudspeakers (with metal membranes for corrosive media) can, for instance, be used.

Figure 4:
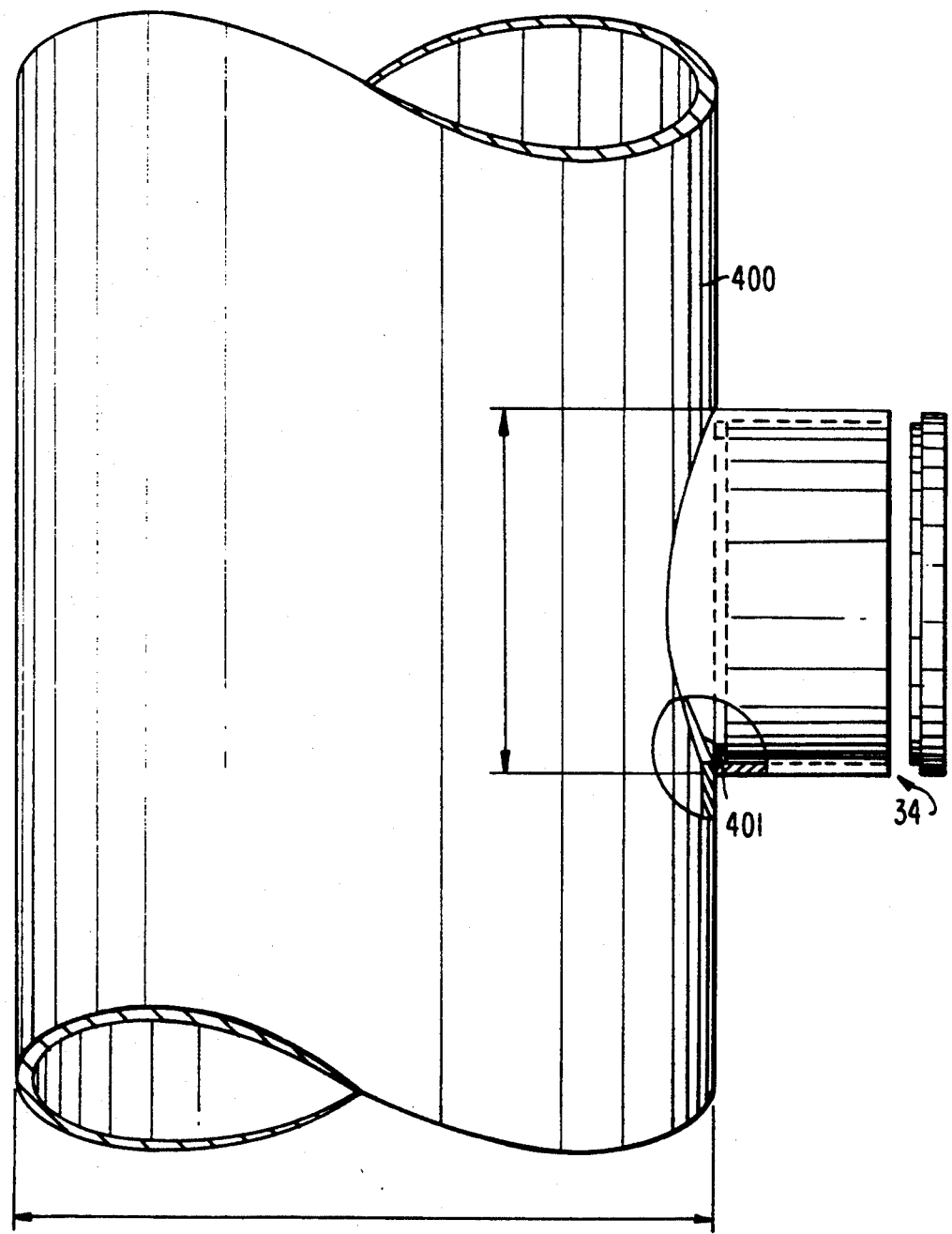
FIG. 4 shows an example of the mounting of a loudspeaker in accordance with this invention.

Microphone 35 and loudspeaker 34 are preferably mounted radially on pipe 400 with direct access (e.g., through a hole 401) to the inside of the pipe (as shown in FIG. 4 on the example of a loudspeaker 39). This attachment of microphone 35 and loudspeaker 34 is preferred since, in this way, no projections into pipe 400 are necessary which might otherwise lead to damage to the tobacco.

Upon the production of cigarettes the loudspeakers, for operational reasons, will preferably be mounted radially, with airtight connection to the corresponding pipe connection in the feeder in a form (connector or housing) similar to that shown in FIG. 4. There are certain installation restrictions: first, the loudspeaker should not be arranged outside of the feeder. Second, the pipe should be in a vertical position at the point of installation. Third, the mechanical stressing of the loudspeaker inserts by oscillations of the feeder drive must be taken into account. Fourth, the fact that the surroundings contain very fine tobacco dust must be taken into account. Fifth, there should be only limited use of plastics. Sixth, detachable parts which could enter into the tobacco, as well as attachments or inserts which extend into the inside of the feed pipe, should be avoided.

Loudspeakers 34 are preferably arranged close to the start of the pipe connection in the feeder. Upon the drawing of the tobacco out of the feeder, the flow of tobacco is constricted at the start of the pipe connection so that the contamination of the loudspeakers by tobacco dust is kept small.

For the preferred installation of microphone 35 in the direct vicinity of the rod maker radially on the feed pipe, the restrictions referral to above in connection with loudspeaker 34 should be observed. However, in contradistinction to loudspeaker 34, microphone 35 is preferably arranged piggyback on a horizontal length of pipe at its uppermost point.

Each loudspeaker 34 and each microphone 35 should be adjustable with respect to acoustic pressure level and amplification so that upon analysis of the useful-signal level only a threshold-value level or a difference in level need be adjusted as fixed value.

The useful-signal/acoustic pressure level of each loudspeaker 34 (for instance in the feeder) must be able to be set high enough, in operation, that a difference between the background noise level and the amplitude of the useful signal, after passage through the filter employed, of at least 10 dB, and preferably 15 dB, can be measured on each microphone 35 (for instance directly on the rod maker). The acoustic pressure level is evaluated as a linear mean under the customary production conditions over an 8 second sampling time. With respect to the long-term constancy of the frequency radiated, loudspeaker 34 must not drift out of the filter selection range of microphone 35, or vice versa. The acoustic pressure level difference between useful-signal and background-signal pressure levels on the rod maker must not exceed 10 dB.

Thus, it is seen that a simple and practical method of checking the existence of pipeline connections has been provided. One skilled in the art will appreciate that the present invention can be practiced by other than the disclosed embodiment, which is presented for purposes of illustration and not of limitation, and the present invention is limited only by the claims that follow.

What is claimed is:

1. A method of checking the existence of a connection between two end points of a pipeline, said method comprising:

producing acoustic signals at one end point with a transmitter in the pipeline, the frequency of the acoustic signals being above the frequency of ambient noises and below an upper limit which results from the formula $f=c/2d$, in which f is the frequency, c the acoustic velocity of the material in the tube (gas, fluid), and d the inside diameter of the pipeline;

converting the acoustic signals into an electrical signal by an acoustic sensor at the other end point; and comparing the electrical signal with a threshold value; wherein:

the presence of a pipeline connection is indicated when said electrical signal exceeds said threshold value.

2. A method according to claim 1, further comprising controlling the transmitter by a frequency generator via an amplifier.

3. A method according to claim 1, wherein the acoustic signals are sinusoidal.

4. A method according to claim 1, further comprising transmitting the acoustic signals continuously during time of measurement.

5. A method according to claim 1, further comprising transmitting the acoustic signals in pulse form.

6. A method according to claim 1, further comprising amplifying the electrical signal produced by the acoustic sensor and filtering out frequencies outside frequency range of the transmitter.

7. A method according to claim 1 wherein said acoustic signals are produced continually, said method further comprising continually analyzing said comparison of the electrical signal with the threshold value.

8. A method according to claim 1 wherein said acoustic signals are produced periodically, said method further comprising analyzing said comparison of the electrical signal with the threshold value based on the number of times the threshold value is exceeded.

9. A method according to claim 1 for checking complex pipeline systems in which an acoustic transmitter is arranged at a first end of each pipeline and an acoustic sensor is arranged at a second end of each pipeline, said method further comprising multiplexing control of the transmitters, and control of the sensors beyond the threshold value of the transmitters, with multiplexers.

10. A method according to claim 9 comprising setting said multiplexers manually.

11. A method according to claim 9 comprising setting said multiplexers automatically.

* * * * *